J. I. HOLCOMB AND J. F. HOKE, Jr.
BUTTERING DEVICE.
APPLICATION FILED DEC. 27, 1920.
1,410,307.
Patented Mar. 21, 1922.
2 SHEETS—SHEET 1.
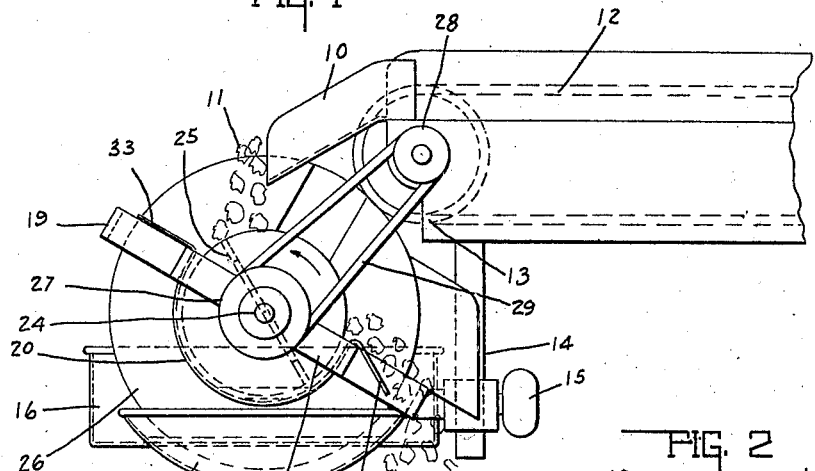
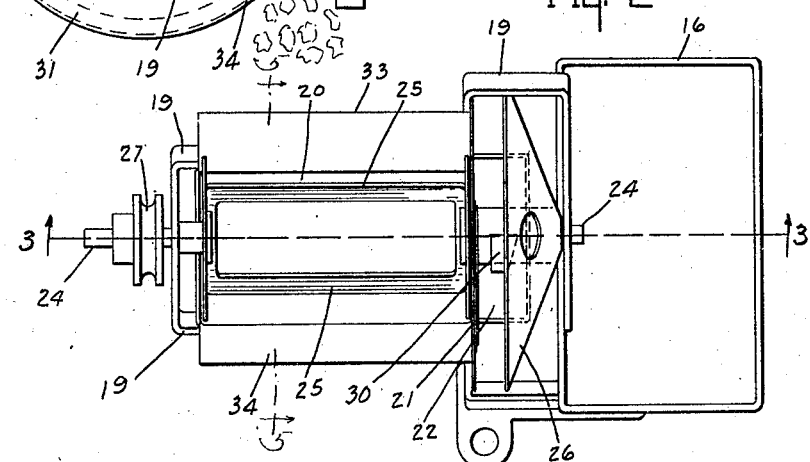
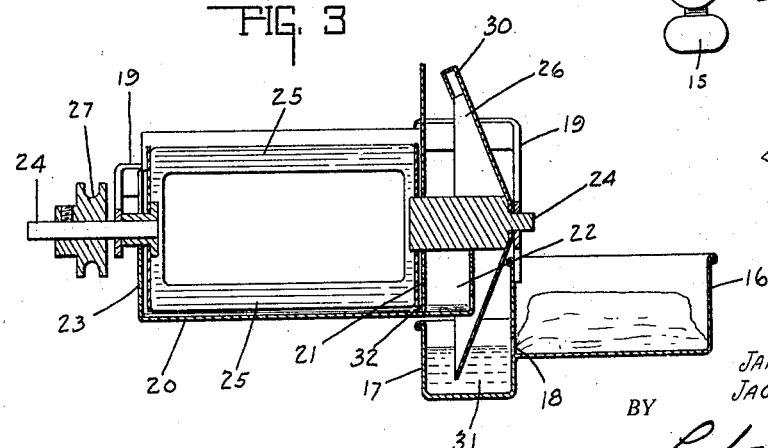
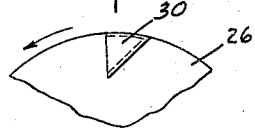
INVENTORS.
JAMES I. HOLCOMB
JACOB F. HOKE, JR.
BY
ATTORNEYS.

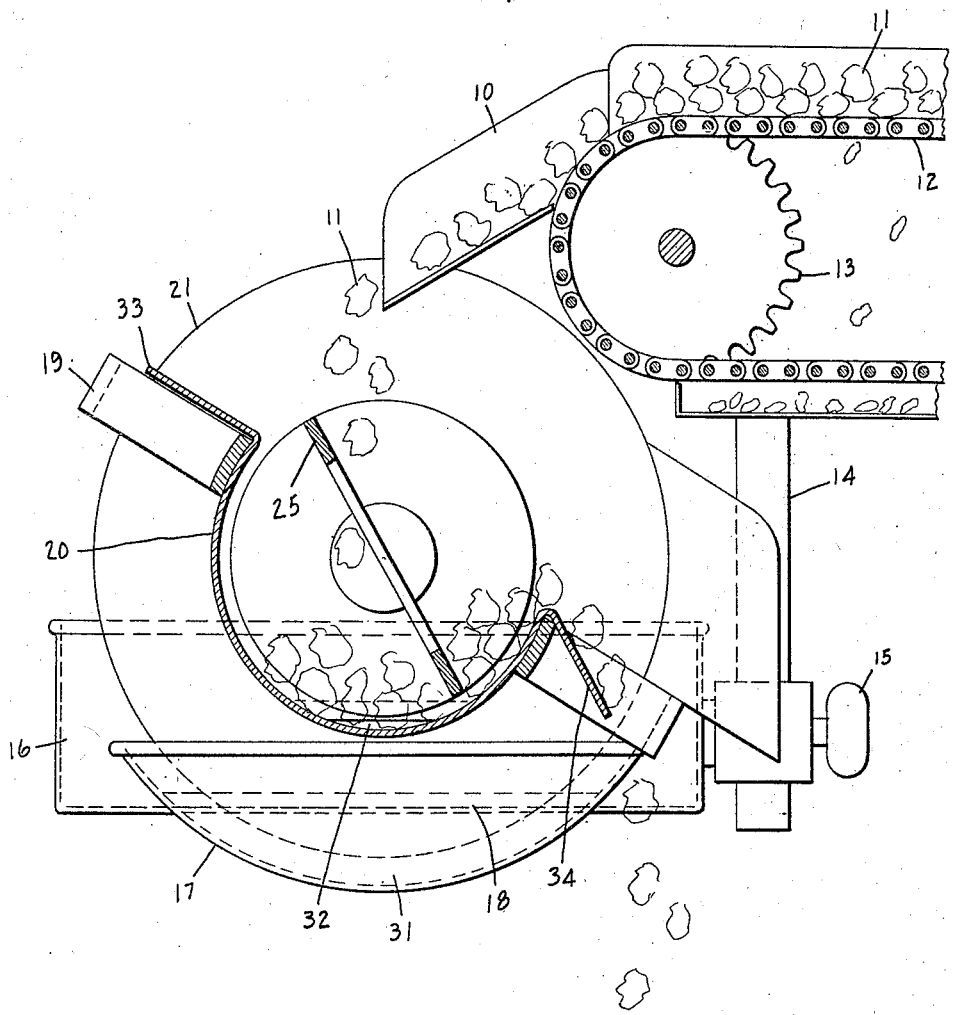

UNITED STATES PATENT OFFICE.

JAMES I. HOLCOMB AND JACOB F. HOKE, JR., OF INDIANAPOLIS, INDIANA, ASSIGNORS TO HOLCOMB & HOKE MANUFACTURING COMPANY, OF INDIANAPOLIS, INDIANA.

BUTTERING DEVICE.

1,410,307.  Specification of Letters Patent.  Patented Mar. 21, 1922.

Application filed December 27, 1920. Serial No. 433,459.

*To all whom it may concern:*

Be it known that we, JAMES I. HOLCOMB and JACOB F. HOKE, Jr., citizens of the United States, and residents of Indianapolis, county of Marion, and State of Indiana, have invented a certain new and useful Buttering Device; and we do hereby declare that the following is a full, clear, and exact description thereof, reference being had to the accompanying drawings, in which like numerals refer to like parts.

This invention relates to a buttering device for pop corn machines and the like, whereby the discharged popped corn will be properly and individually buttered.

The chief object of the invention is to provide a continuously operative buttering device into which the popped corn is discharged which will cause the pop corn to be passed through a thin layer of butter before being discharged.

The full nature of this invention will be understood from the accompanying drawings and the following description and claims.

In the drawings Fig. 1 is an end elevation of the buttering device. Fig. 2 is a plan view looking down. Fig. 3 is a central longitudinal section taken on the line 3—3 of Fig. 2. Fig. 4 is a front elevation of the butter supplying disk. Fig. 5 is a horizontal section taken through the trough and paddle with the other parts of the device removed.

In the drawings there is shown the discharge spout 10 of a pop corn machine to which the popped corn 11 is carried on an endless chain 12. The endless chain is carried and drawn by the sprocket wheel or pulley 13. Supported from the machine substantally under the discharge spout 10 there is a buttering device for properly buttering the popped corn discharged therefrom, which is supported upon a depending bracket 14 and secured thereto by the thumb screw 15. The buttering device consists of a butter receiving receptacle 16 into which the operator places a cake of butter. The butter receptacle is provided with the heating element adapted to be mounted in any desired position, preferably under it, which heating element is not shown herein, whereby said butter will be melted and will flow into the pocket or chamber 17 through the opening 18 between said chamber and the receptacle 16. Mounted on the frame 19 there is a transversely extending trough 20 provided with a partition 21 which divides it from the end of the trough 22. The partition 21, the frame 19 and the end of the trough 23 are provided with bearings in which is mounted the shaft 24 which carries the revolving paddles 25 and the cone-shaped butter supplying disk 26. The shaft 24 is provided with a pulley 27 driven from the pulley 28 which is mounted on the gear 13, through the belt 29. The cone-shaped disk 26 is provided with a pocket 30 which dips into the butter 31, carrying a supply of butter around until it flows into the trough 22 and flows through the opening 32 down the bottom of said trough to the end thereof.

The frame 19 is provided with an upwardly extending fender 33 on one side thereof and on the other side there is a downwardly extending apron 34.

The popped corn 11 is discharged from the spout 10 into the trough 20, as shown in Fig. 1. The bottom of the trough being supplied with a coating of butter from the pocket 30, butters the popped corn as it is scraped around the surface thereof by the paddles 25. The inner trough may be filled with popped corn, but the paddles being only of the width of the corn engage only the botom layer thereof scraping it through the butter and over the edge of the apron 34, the remaining supply of corn in the trough awaiting its turn to be engaged and scraped over the buttered surface thereof. Because of the narrow width of the paddles no corn will be discharged until it has been properly buttered by scraping it through the supply in the bottom of the trough, thereby assuring the proper buttering of the entire supply of corn and preventing any corn from being discharged until it has been scraped along the bottom.

The invention claimed is:

1. A buttering device for pop corn machines including a trough, means for supplying the trough with a relatively shallow supply of melted butter, and a rotatable member having an opening therein mounted on said trough for engaging and scraping the popped corn over the buttered surface thereof and discharging it therefrom, and permitting the unbuttered popped corn to pass through said opening and remain in said trough.

2. A buttering device for pop corn machines including a trough, means for supplying said trough with a relatively shallow supply of melted butter, and a rotatable paddle wheel mounted in said trough, the body portion of the paddles being of substantially the same width as the layer of popped corn, and spaced from the axis of the wheel, whereby the layer engaged by said paddles will be scraped through the butter supply and discharged therefrom, and the upper unbuttered layer permitted to drop back into the trough.

3. A buttering device for pop corn machines including a trough having a cylindrical bottom, means for supplying said trough with a relatively shallow supply of melted butter, and a revolving paddle wheel mounted in said trough so that one edge will be caused to pass about the inner surface and in close proximity thereof, said paddle being of substantially the same width as a layer of corn and spaced from the axis of the wheel whereby it will engage only the lower layer so as to scrape it through the butter and over the edge of the trough and permit the upper layers to remain therein until engaged, buttered and discharged by said paddle as the lower layer.

4. A buttering device for pop corn machines including a trough, a chamber for containing melted butter mounted in conjunction with said trough, a revolving wheel adapted to revolve with said chamber, a pocket on said wheel for dipping the butter from said chamber and discharging it into said trough, and a rotatable member mounted in said trough having an open space therein, for causing the popped corn discharged into said trough from the machine to be scraped through the butter and discharged therefrom, and the unbuttered popped corn to pass through the open space and remain in said trough.

In witness whereof, we have hereunto affixed our signatures.

JAMES I. HOLCOMB.
JACOB F. HOKE, Jr.